United States Patent [19]

Marr

[11] Patent Number: 4,663,033
[45] Date of Patent: May 5, 1987

[54] REACTIVATEABLE ADSORPTION FILTER ASSEMBLY

[75] Inventor: Douglas S. B. Marr, Cheltenham, England

[73] Assignee: Dowty Fuel Systems Limited, Cheltenham, England

[21] Appl. No.: 831,657

[22] Filed: Feb. 20, 1986

[30] Foreign Application Priority Data

Mar. 21, 1985 [GB] United Kingdom ............... 8507397

[51] Int. Cl.⁴ ..................... B01D 15/00; B01D 53/02
[52] U.S. Cl. ................................. 210/108; 55/189;
  55/387; 210/116; 210/117; 210/266; 210/277
[58] Field of Search ..................................... 55/74–79,
  55/387–390, 189; 210/678, 136, 257.1, 275, 277,
  108, 116, 117, 266

[56] References Cited

U.S. PATENT DOCUMENTS 4,561,865 12/1985 McCombs et al. .................. 55/387

Primary Examiner—Ivars Cintins
Attorney, Agent, or Firm—Hayes, Davis & Soloway

[57] ABSTRACT

A reactivateable adsorption filter assembly comprises an adsorption filter element, a storage vessel in which is stored filtered fluid, a flow restrictor to restrict the flow of fluid between the adsorption filter element and the storage vessel and a purge valve on the inlet side of the adsorption filter element to selectively connect the filter assembly to a source of fluid at a low pressure, the arrangement being such that when the purge valve is opened to said source of fluid at low pressure filtered fluid containing adsorbate at a very low partial pressure flows back from the storage vessel through the adsorption filter element thereby reactivating said adsorption filter element.

4 Claims, 3 Drawing Figures

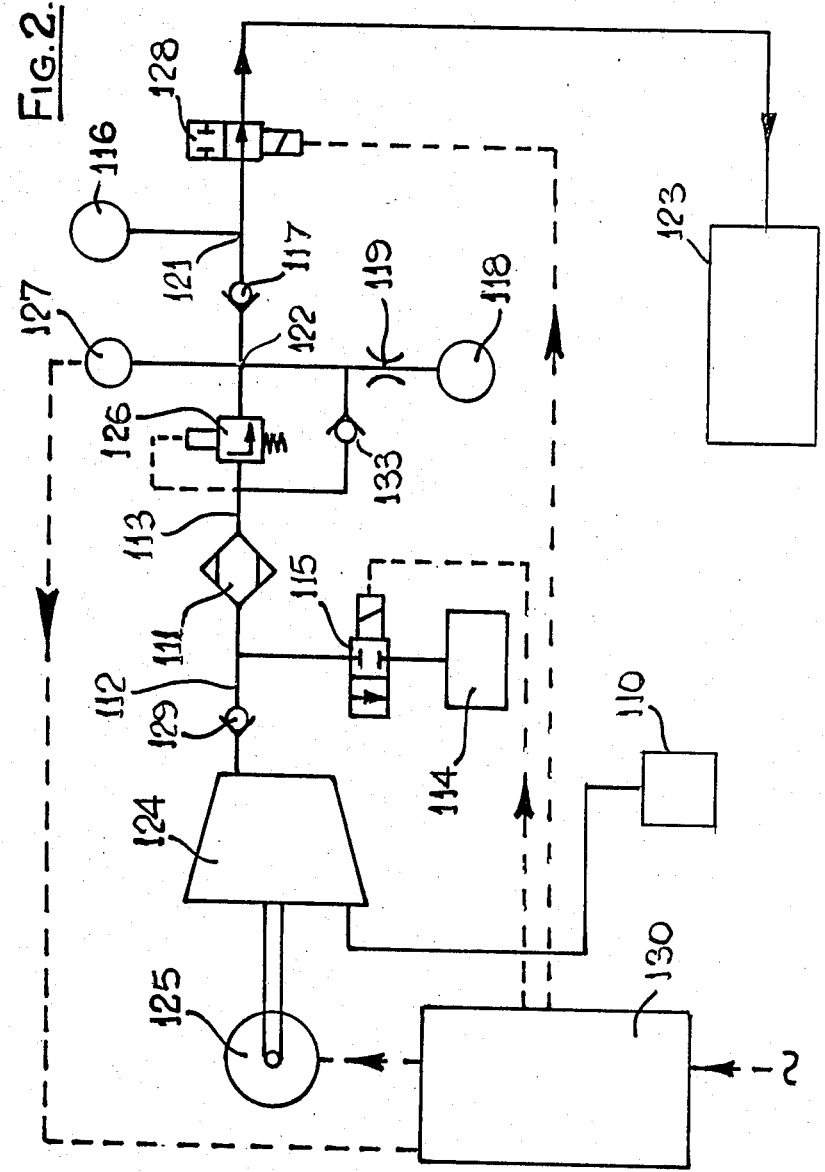

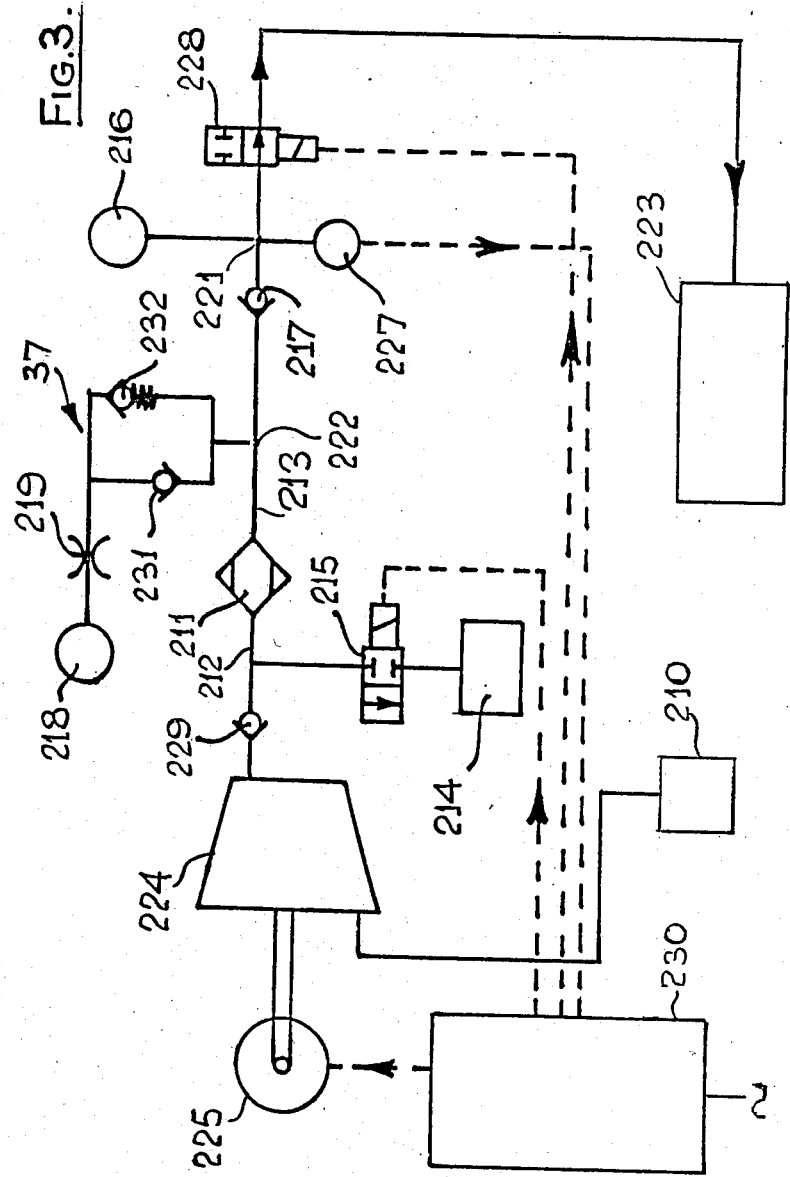

REACTIVATEABLE ADSORPTION FILTER ASSEMBLY

This invention relates to a reactivateable adsorption filter assembly.

It is known that it is possible to reactivate an adsorption filter element by purging the filter element with fluid containing adsorbate at a partial pressure below the partial pressure at which the adsorbate was originally adsorbed from the fluid passed through the filter element.

Such reactivateable adsorption systems commonly include two adsorber vessels, one of which is kept on stream while the other is being reactivated.

Such systems have the disadvantage that complicated valving arrangements are often required to change over from supply to reactivation.

It is a further disadvantage that the size of such systems is often larger than that strictly required due to the need to have two adsorber vessels.

It is an object of this invention to provide a smaller and simpler reactivateable adsorption filter assembly.

According to the invention there is provided a reactivateable adsorption filter assembly comprising an adsorption filter element, a fluid inlet to supply the filter element with fluid to be filtered, a fluid outlet to transfer filtered fluid away from the filter element a reservoir connected to the fluid outlet, a storage vessel connected to the fluid outlet, a restrictor to restrict the flow of fluid between said storage vessel and the fluid outlet, a check or non-return valve to prevent fluid flowing from said reservoir back to the filter element and a purge valve to selectively connect the fluid inlet to a source of fluid at low pressure relative to the normal working pressure of the filter element, the arrangement being such that upon opening the purge valve fluid containing adsorbate at a very low partial pressure will flow back from the storage vessel through the filter element to the source of fluid at low pressure thereby reactivating the filter element.

The filter assembly may further comprise a valve arrangement that is operative to prevent the flow of fluid into the storage vessel before the pressure in the fluid outlet has reached a predetermined level.

The invention will now be described by way of example with reference to the accompanying drawings in which:

FIG. 2 Shows in schematic form a reactivateable adsorption filter assembly similar to that of FIG. 1 but including a first modification.

FIG. 3 Shows in schematic form a reactivateable adsorption filter assembly similar to that of FIG. 1 but including a second modification.

Figure 1:
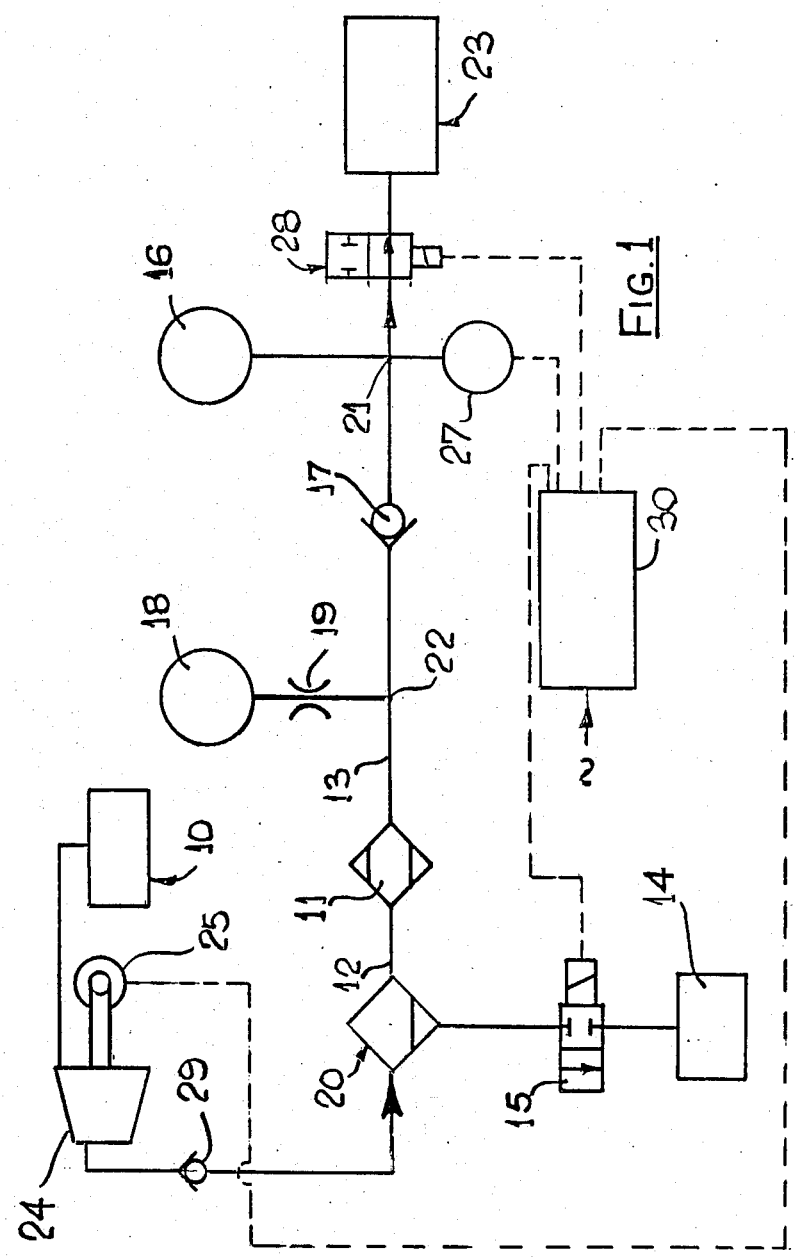
FIG. 1 Shows in schematic form a reactivateable adsorption filter assembly according to the invention.

With reference to FIG. 1 there is shown a source 10 of impure fluid to be filtered arranged to be supplied to a reactivateable adsorption filter assembly by means of the compressor 24 which is driven by a motor 25, the filter assembly being connected to the compressor by means of the fluid inlet 12. The fluid inlet 12 connects the source 10 of impure fluid to an inlet side of an adsorption filter element 11. A coalescer 20 is situated upstream of the filter element 11 to pre-treat the impure fluid before it reaches the filter element 11.

A purge valve 15 is arranged to selectively connect the filter assembly and in particular the fluid inlet 12 to a source 14 of fluid at a pressure lower than that normally present in the filter element 11. The purge valve 15 is opened or closed in response to an external control signal sent from an electronic control unit 30.

A fluid outlet 13 is provided to connect the filter element 11 to an isolation valve 28. The isolation valve 28 is used to selectively connect or disconnect the filter assembly from a fluid receiving means 23 for which filtered fluid is required.

The isolation valve 28 is opened in response to a control signal from the electronic control unit 30 when the pressure in the fluid outlet 13 reaches a predetermined pressure. The pressure in the fluid outlet 13 is measured by a pressure transducer 27 which sends a feedback signal to the electronic control unit 30.

A reservoir 16 is connected to the fluid outlet 13 between the isolation valve 28 and the filter element 11 at a position of connection 21. A non-return or check valve 17 is connected into the fluid outlet 13 between the position of connection 21 and the filter element 11 to allow filtered fluid to pass downstream towards the isolation valve 28 and into the reservoir 16 but prevent flow from the reservoir back towards the filter element 11. The reservoir 16 provides a source of filtered fluid which is immediately available upon opening the isolation valve 28 and which can be used to maintain a continuity of flow during reactivation of the filter element.

A storage vessel 18 is connected to the fluid outlet 13 upstream of the check valve 17 at a position of connection 22. A restrictor 19 is connected between the storage vessel 18 and the fluid outlet 13 to restrict the flow into and out of the storage vessel 18. The restrictor 19 enables a small mass of filtered fluid to be used to effect reactivation of the filter element.

During normal operation of the filter assembly impure fluid containing adsorbate at high partial pressure will pass from the source 10 into the filter assembly through the filter element 11 and filtered fluid containing the adsorbate at low partial pressure will pass out of the filter assembly through the isolation valve 28, the purge valve 15 being kept closed.

When, however it is necessary to reactivate the filter element 11 the supply of impure fluid is halted by stopping the compressor 24 and the purge valve 15 is opened allowing filtered fluid containing adsorbate at very low partial pressure to flow back through the filter element 11 from the storage vessel 18. The presence of the restrictor 19 ensures that as fluid flows back from the storage vessel 18 it will expand thereby providing a large volume of fluid containing adsorbate at very low partial pressure to reactivate the filter element 11. When sufficient fluid has passed through the filter element 11 to reduce the amount of adsorbate trapped in the filter element 11 to an acceptable level the purge valve 15 is closed and the supply of impure fluid can be resumed by starting the compressor 24.

To prevent fluid flowing back into the compressor 24 when it is stopped, to allow the filter element 11 to be reactivated, a non-return valve 29 is fitted into the fluid inlet 12.

With reference to FIG. 2 there is shown a reactivateable adsorption filter assembly which is in many respects similar to that previously described with respect to FIG. 1 and will function in a similar manner.

In FIG. 2 there is shown a source 110 of impure fluid for supply to the reactivateable adsorption filter assembly by a compressor 124 driven by a motor 125 the compressor supplying fluid to a fluid inlet 112 of the filter assembly.

The fluid inlet 112 is connected through a non-return valve 129 to a reactivateable adsorption filter element 111 and through a purge valve 115 to a external source 114 of fluid at a pressure lower than that normally present in the filter element 111.

The purge valve 115 is opened or closed in response to a control signal sent from an external electronic control unit, unit 130.

A fluid outlet 113 connects the element 111 to a reservoir 116 and a storage vessel 118. An isolation valve 128 is connected to the fluid outlet 113 to selectively isolate the filter assembly from an external fluid receiving means 123 for which filtered fluid is required.

A non-return valve 117 is connected into the fluid outlet 113 between a position of connection 121 of the reservoir 116 to the fluid outlet 113 and a position of 122 of the storage vessel 118 to the fluid outlet 113.

A pressure transducer 127 is connected to the fluid outlet 113 and provides a feedback of outlet pressure to the electronic control unit 130.

A restrictor 119 is positioned between the storage vessel 118 and the fluid outlet 113 to restrict the flow of fluid into and out of the storage vessel 118. Valve means in the form of a valve arrangement comprising a shut off valve 126 and a non-return valve 133 is provided to prevent fluid entering the storage vessel 118 or the reservoir 116 before sufficient pressure level has been reached in the filter element 111. The non-return valve 133 being arranged to allow fluid to flow from the storage vessel 118 towards the filter element 111 but to prevent flow in the opposite direction. The arrangement is therefore such that fluid can only flow into the storage vessel 118 when the shut off valve 126 is open.

Operation of the filter assembly is substantially as described with reference to FIG. 1 the filter element 111 being reactivateable by opening the purge valve 115 and stopping the compressor 124 thereby allowing filtered fluid to flow back from the storage vessel 118 to the source 114.

With reference to FIG. 3 there is shown a second modified reactivateable adsorption filter assembly which in many respects is similar to that previously described with respect to FIG. 1 and which will function in a similar manner.

In FIG. 3 there is shown a source 210 of impure fluid for supply to the reactivateable adsorption filter assembly by means of a compressor 224 driven by a motor 225, the compressor 224 supplying fluid to a fluid inlet 212 of the filter assembly.

The fluid inlet 212 is connected through a non-return valve 229 to a reactivateable adsorption filter element 211 and through a purge valve 215 to an external source 214 of fluid at a pressure lower than that normally present in the filter element 211.

The purge valve 215 is opened or closed in response to a control signal sent from an external electronic control unit 230.

A fluid outlet 213 connects the filter element 211 to a reservoir 216 and a storage vessel 218 used to store filtered fluid.

An isolation valve 228 is connected to the fluid outlet 213 to selectively isolate the filter assembly from an external fluid receiving means 223 for which filtered fluid is required.

A non-return valve 217 is connected in the fluid outlet 213 between a position of connection 221 of the reservoir 216 to the fluid outlet 213 and a position of connection 222 of the storage vessel 218 to the fluid outlet 213.

A pressure transducer 227 is connected to the fluid outlet 213 to provide a feedback of outlet pressure to the electronic control unit 230.

A restrictor 219 is positioned between the storage vessel 218 and the fluid outlet 213 to restrict the flow of fluid into and out of the storage vessel 218.

A Valve means, in the form of a valve arrangement comprising a non-return valve 231 and a pressure relief valve 232 connected in parallel, is located between the restrictor 219 and the fluid outlet 213.

The arrangement of the non-return valve 231 and the pressure relief valve 232 is such that a predetermined pressure is always maintained in the storage vessel 218. This is achieved by arranging for the pressure relief valve 232 to close at this predetermined pressure preventing any further loss of fluid from the storage vessel 218. The residual pressure remaining in the storage vessel 218 will prevent any fluid from entering the storage vessel 218 until the pressure in the fluid outlet 213 exceeds the residual pressure in the storage vessel 218. When the pressure in the fluid outlet 213 does exceed the residual pressure in the storage vessel 218, it will open the non-return valve 231 and fluid will flow into the storage vessel 218. The non-return valve 231 and the pressure relief valve 232 therefore operate to prevent fluid entering the storage vessel 218 until a pre-determined pressure has been reached.

Operation of the reactivateable adsorption filter assembly is substantially as described with reference to FIG. 1, to reactivate the filter element 211 the purge valve 215 is opened and the compressor 224 is stopped thereby allowing fluid to flow back from the storage vessel 218 through the restrictor 219, the pressure relief valve 232 and the filter element 211 to the low pressure source 214.

Although the invention has been described with reference to three specific embodiments in which in each case the purge valve and the isolation valve have been controlled by an electronic control unit it will be appreciated by those skilled in the art that these valves could be manually controlled without reducing the advantageous effects of the invention.

In addition the source of low pressure could be merely the surrounding atmosphere or it could be a chamber or tank evacuated to provide a partial vacuum.

I claim:

1. A reactivateable adsorption filter assembly comprising an adsorption filter element having a fluid inlet for connection to a source of fluid to be filtered and a fluid outlet for supply of filtered fluid to fluid receiving means, a storage vessel connected to the fluid outlet by means of a first line for receiving a quantity of filtered fluid from the fluid outlet and for supplying said quantity of filtered fluid to reactivate the filter element, a restrictor disposed in the first line for restricting flow of fluid between the storage vessel and the fluid outlet, pressure responsive valve means connected to the fluid outlet for preventing flow of filtered fluid into the storage vessel until the pressure at the fluid outlet has reached a predetermined level, a purge valve connected to the fluid inlet for placing the fluid inlet in fluid communication with a source of fluid at low pressure relative to the normal working pressure of the filter element, whereby, upon opening of the purge valve, fluid containing absorbate at a very low partial pressure will flow back from the storage vessel through the filter element to the source of fluid at low pressure to reactivate the filter element, a reservoir connected to the fluid outlet by means of a second line for receiving a quantity of filtered fluid from the fluid outlet and for supplying said quantity of filtered fluid to the fluid receiving means during reactivation of the filter element to maintain continuity of fluid flow to the fluid receiving means, and a check or non-return valve disposed in the second line to prevent fluid flowing from the reservoir back to the filter element.

2. A filter assembly as claimed in claim 1 in which the pressure responsive valve means comprises a first path for flow of fluid from the storage vessel to the filter element, a second path, in parallel with the first path, for flow of fluid from the filter element to the storage vessel, a non-return valve disposed in the first path and arranged to allow fluid to flow along the first path from the storage vessel to the filter element, and a shut-off valve disposed in the second path and arranged to allow fluid to flow along the second path from the filter element to the storage vessel only when the pressure at the fluid outlet has reached said predetermined level.

3. A filter assembly as claimed in claim 1 in which the pressure responsive valve means comprises a first path for flow of fluid from the storage vessel to the filter element, a second path, in parallel with the first path, for flow of fluid from the filter element to the storage vessel, a pressure relief valve disposed in the first path and arranged to allow fluid to flow along the first path from the storage vessel to the filter element during reactivation of the filter element but to prevent such flow when the pressure of fluid in the storage vessel falls below a preset level, whereby a residual pressure remains in the storage vessel, and a non-return valve disposed in the second path and arranged to allow fluid to flow along the second path from the filter element to the storage vessel when the pressure at the fluid outlet exceeds the residual pressure in the storage vessel.

4. A filter assembly as claimed in claim 1 in which the filter assembly further comprises a coalescer connected to the fluid inlet upstream of the filter element, the purge valve being connected to the fluid inlet by way of the coalescer, whereby, upon opening of the purge valve, fluid containing absorbate at a very low partial pressure will flow back from the storage vessel through the filter element and the coalescer to the source of fluid at low pressure.

* * * * *